Dec. 14, 1943.                P. J. McCULLOUGH                2,336,696
                                AUTOMATIC TOASTER
                              Filed Nov. 12, 1940        4 Sheets-Sheet 1

INVENTOR.
Paul J. McCullough
BY
Rodney Bedell
ATTORNEY.

Dec. 14, 1943.　　　P. J. McCULLOUGH　　　2,336,696
AUTOMATIC TOASTER
Filed Nov. 12, 1940　　　4 Sheets-Sheet 3

INVENTOR.
Paul J. McCullough
BY
Rodney Bedell
ATTORNEY.

Dec. 14, 1943.  P. J. McCULLOUGH  2,336,696
AUTOMATIC TOASTER
Filed Nov. 12, 1940  4 Sheets-Sheet 4

INVENTOR.
Paul J. McCullough
Rodney Bedell
BY
ATTORNEY.

Patented Dec. 14, 1943

2,336,696

UNITED STATES PATENT OFFICE 2,336,696

AUTOMATIC TOASTER

Paul J. McCullough, St. Louis, Mo., assignor to Joseph Pavelka, St. Louis, Mo.

Application November 12, 1940, Serial No. 365,255

13 Claims. (Cl. 99—328)

The invention relates to cooking devices and more particularly to automatic toasters heated electrically and constructed to terminate the cooking operation at the end of a predetermined period.

One of the objects of the invention is to arrange for the automatic projection of a substantial portion of the slice of toast beyond the toaster housing at the end of a toasting operation to indicate that the toasting operation is completed and also to facilitate the removal of the slice from the toaster by one hand of the user and thereby avoid the necessity of manually operating a slice carrier with one hand while the slice is removed with the other hand.

Another object of the invention is to provide, when desired, for the retention of substantially the entire slice within the toaster housing for an indefinite period following the completion of the toasting operation, whereby the toast is maintained hot until the user is ready to remove it from the toaster. Preferably, although the slice is so retained, it is moved to a position other than its position during the toasting operation (although not projected substantially from the housing as indicated above) to indicate visibly that the toasting operation has been completed.

Another object is to utilize a single manually operable element for starting the toasting operation (i. e., lowering the slice into the housing, setting the switch and energizing the timing mechanism), for raising the toast at any time during the toasting operation for inspection or removal, and for releasing the toast carrier from the retention means referred to above, if the latter is being used.

Another object is to provide a uniform degree of toasting of successive slices by varying the length of the toasting period according to the heat in the toasting chamber at the time the toasting operation is started.

Another object is, to interlock framing elements of the toaster mechanism and associated parts so they may be held in assembled relation by a minimum number of screws, preferably a single screw.

Another object of the invention is to move the toast relatively to the heater throughout the toasting operation and thereby avoid stripes in the toast due to the bars holding the slice of bread against contact with the heating elements.

Another object is to place the switch contact points under spring tension which will be released instantly when the toasting operation is completed, irrespective of whether the toast is ejected at the end of the toasting operation or is retained within the toasting chamber. Preferably this tension will be provided by the main spring of the timing mechanism.

These and other detailed objects are attained by the structure illustrated in the accompanying drawings in which—

In Figures 1, 2 and 3 the slice carrier is shown in elevated or toast projecting position.

Figure 1:
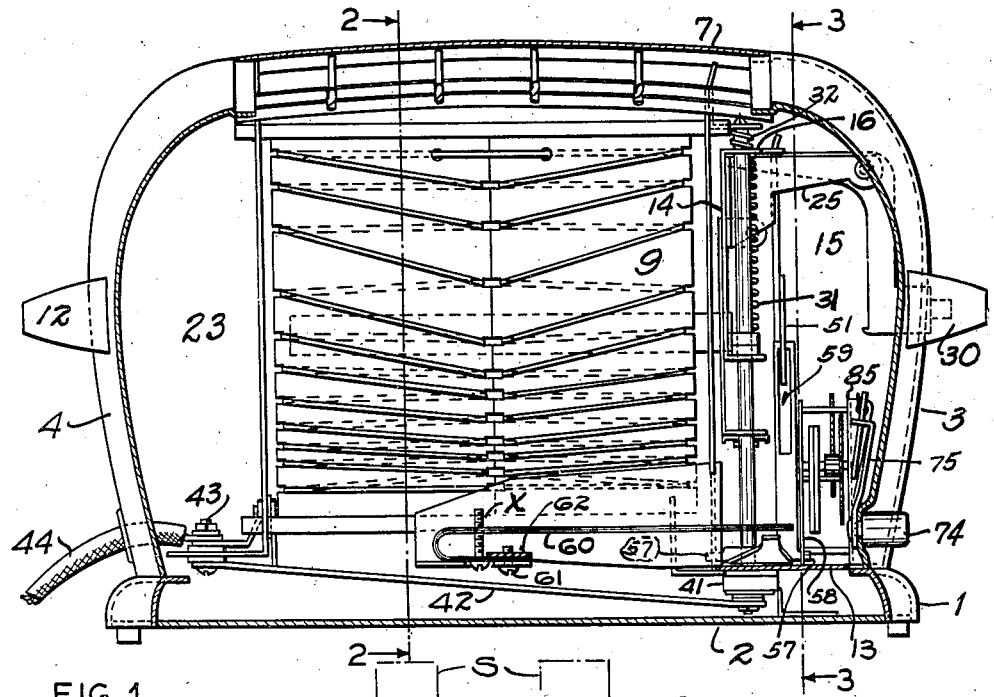
Figure 1 is a vertical longitudinal section through the toaster and is taken approximately on the line 1—1 of Figure 2.

The toaster includes a base 1, having a bottom wall 2, and a housing having end walls 3 and 4, side walls 5 and 6, and a top wall 7 provided with elongated slots 8 for receiving the bread slices. Heating elements 9 and guard wires 10 of familiar construction are mounted on the housing walls by brackets 11 or in any other suitable manner. A handle 12 of plastic or other non-heat conducting material is fixed on housing end wall 4.

A horizontal partition plate 13 and a vertical partition plate 14 cooperate with end wall 3 to form a compartment 15 for the operating mechanism, and plate 14 mounts a portion of the latter. For this purpose, plate 14 is provided with a bracket 16 near its upper end, and slide rods 17 are fixed in bracket 16 and plate 13.

A carriage 18 is slidable vertically on rods 17 but provided with upper and lower flanges 19 and 20 apertured to receive the rods. Bars 21 are secured to carriage 18 and extend therefrom through slots 22 in plate 14 into the toasting chamber 23 and form carriers for the bread slices, indicated at S, fingers 24 being struck out from the sides of bars 21 to form a wide skeleton base for supporting the slices. A bracket 25 is secured to carriage 18 and extends outwardly therefrom and at its outer end carries a pivot 26 mounting a bell crank having a horizontally disposed leg 27 and a vertically disposed leg 28. The inner end of leg 27 is disposed to engage the underside of flange 19 to limit rotation of the bell crank in an anticlockwise direction. A spring 80 yieldingly thrusts the bell crank into the position shown in Figure 8. A projection on the lower end of leg 28 extends outwardly through a slot 29 in housing end wall 3 and is fitted with a handle 30 which is a duplicate of handle 12 fixed to housing wall 4. When carriage 18 is in its uppermost position (Figures 1 and 3), handle 30 is at the same level as handle 12 and the two handles may be used to lift the toaster bodily. Handle 30 has additional functions as described below.

A tension spring 31 is anchored to bracket 16 with its lower end secured to flange 20 whereby spring 31 tends to raise carriage 18 and all the parts mounted thereon. Spring 31 constitutes the main spring actuating the clockwork timing mechanism indicated generally at C and housed between upright plates 58 and 85. Relatively short floating bumper springs 32 surround rods 17 and are compressed between bracket 16 and flange 19 as carriage 18 approaches bracket 16 (Figures 1 and 3) and lessen the jar and noise attending the release of the timing mechanism and upward movement of the carriage.

Paralleling bracket 18 is an upright plate 33 having a horizontal flange 33a apertured for rods 17, and plate 33 is slidable on rods 17 relative to carriage 18 and the parts mounted thereon. The upper end of plate 33 has an ear 34 projecting outwardly through a slot 35 (Figures 3 and 7) in carriage 18, and a tension spring 36 has its lower end anchored to carriage flange 20 and its upper end secured to ear 34 on plate 33 whereby the latter is normally positioned relative to carriage 18 as indicated in Figure 8. A strip 37 of insulating material is carried on flange 33a of plate 33 and mounts the spaced buttons 38 arranged to contact with buttons 39 mounted through suitable insulation 40 on a yoke 41 depending from and carried by plate 13 as described below and supporting the corresponding ends of bus-bars 42 connected to terminals 43 through which the toaster is connected by a cord 44 to a source of current supply such as the usual outlet in the house wiring system. When handle 30, carriage 18 and plate 33 are lowered about one-third of their total possible downward movement, buttons 38 and 39 contact to close the toaster switch.

Further downward movement of handle 30 and carriage 18 is accommodated by the stretching of spring 36 in addition to the stretching of spring 31. As such downward movement is continued, flange 19 strikes a shoulder 45 on a bar 46 (Figures 3, 4 and 5) pivoted at its lower end to a lug 47 projecting from a clutch disc 48 connected by a ratchet with the primary gear 49 of the clock mechanism, whereby further downward movement of handle 30 and carriage 18 and bar 46 will rotate disc 48 relative to gear 49 in the direction of arrow A (Figure 5). As flange 19 engages shoulder 45 on bar 46, bracket 18 and bar 46 are latched to each other by a tooth 50 on a detent lever 51 pivoted at 52 on bar 46 and thrust in a clockwise direction by a tension spring 53 anchored to a hook 54 on the lower end of bar 46 and engaging a hook 55 on the right hand end of lever 51.

Thereupon, springs 31 and 36 will rotate gear 49, disc 48 and lug 47 in the direction opposite to arrow A as may be permitted by the clock escapement mechanism, and bar 46, lever 51 and carriage 18 will move upwardly slowly. The clock mechanism is illustrated and described more in detail in the copending application filed by the present applicant January 2, 1940, Serial No. 312,038, now Patent No. 2,274,724, issued March 3, 1942.

Figure 5:
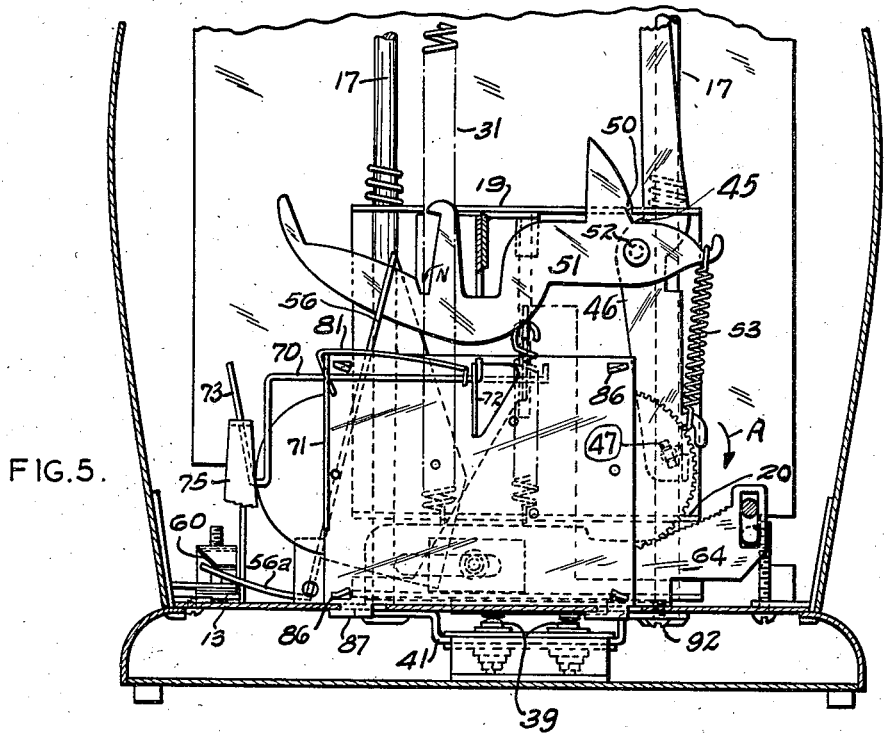
Figure 5 is a similar section showing the same as the toasting operation is being completed and the slice carrier is about to be released to project the upper portion of the toast beyond the toaster housing.
Figure 6:
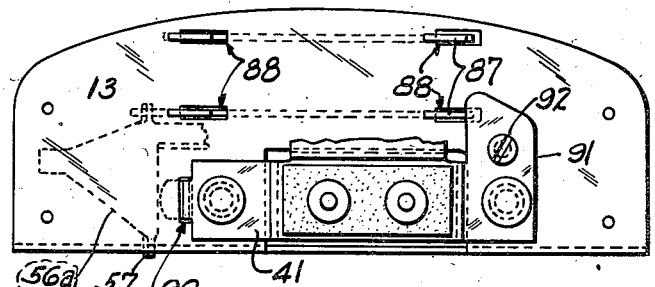
Figure 6 is a bottom view of the stationary portion of the switch and associated structure.

An L-shaped rocker member with a long arm 56 and a short arm 56a (Figures 3, 4 and 5) has pintles 57 journalled in plate 14 and the clock frame plate 58 (Figures 1 and 6) and has its long arm slotted at 59 to receive the left hand end of lever 51. As the lever mounting bar 46, lever 51 and carriage 18 move upwardly and the left hand end of lever 51 engages the upper end of slot 59, the lever is tilted to disengage detent tooth 50 from flange 19 on carriage 18 whereupon the carriage 18 and the parts mounted thereon move upwardly under the pull of spring 31, and the clock mechanism is deenergized. This disengagement of elements 50 and 19 will occur at the end of a timing period which is varied thermostatically and may be varied manually.

Figure 9:
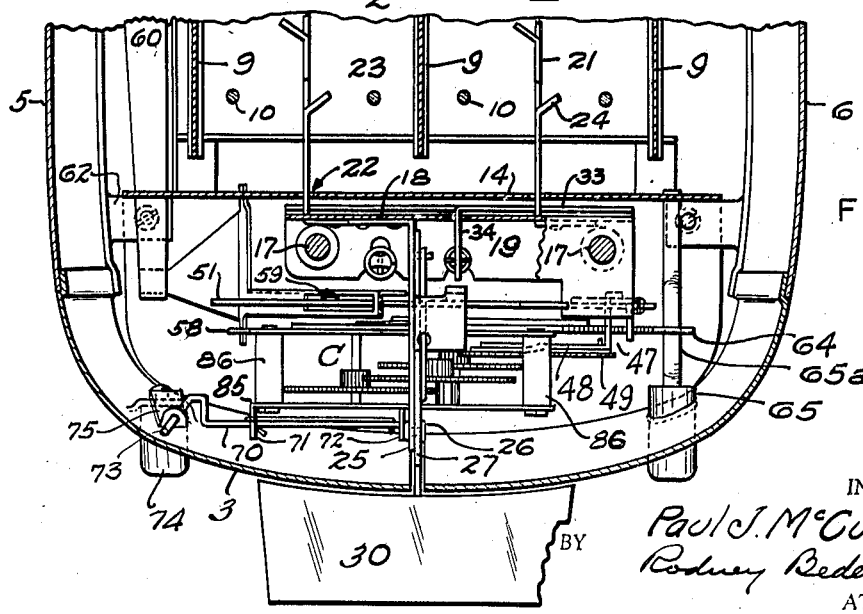
Figure 9 is a detail horizontal section taken on the line 9—9 of Figure 4.

The thermostatic variation is effected by the bimetal thermostatic strip 60 (Figures 1, 3 and 9) anchored by a screw 61 to a tongue 62 on housing side wall 5. The free end of the thermostat overlies the horizontal arm 56a of the rocker. As the temperature of the thermostat increases, it distorts to lower its unsecured end and the corresponding portion of rocker arm 56a, thereby swinging the upright rocker arm 56 to the left and reducing the distance between the upper edge 51a of lever 51 and the top of slot 59 and thereby shortening the time which would elapse before the detent is tripped.

The contour of edge 51a includes a notch N at its right hand end. Obviously, when arm 56 is in the extreme right hand position indicated in Figure 4, there will be the maximum movement before lever 51 strikes the upper end of slot 59. This is the condition which would exist when the toasting operation starts out with a cold toaster when a desired amount of toasting will take a substantially longer period than if the toasting operation is begun while the toaster is warm, as would be the case where successive operations follow each other with short time periods between them. Initial heat may affect the thermostat to move arm 56 to the left rather quickly but the side of notch N forms a shoulder engaging the side of rocker arm 56 and holding it against movement to the left until handle 30 and associated parts, including detent lever 51, are depressed for the next toasting operation when, the toaster parts having been heated, arm 56 may move to the left, according to the temperature of the thermostat, to function as described above. The succeeding toasting operations (if the toaster has not had time to become cold) will begin with the toasting elements and the toasting chamber at a higher temperature than during the initial toasting operation and therefore a shorter toasting period will be required, and such shorter period will be provided by the action of thermostat 60 and its tilting of rocker arm 56 to the left.

With any adjustment, the thermostat is free of direct engagement with the detent lever and is not subject to distortion (and possible set) because of pressure by the detent lever.

Figure 3:
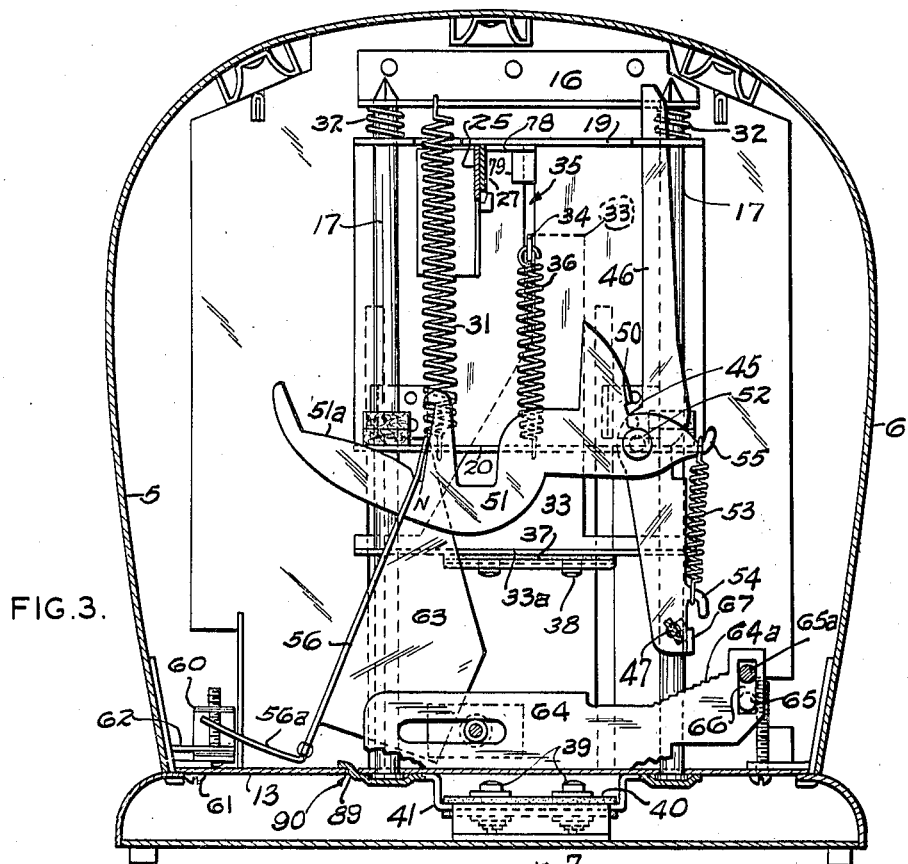
Figure 4:
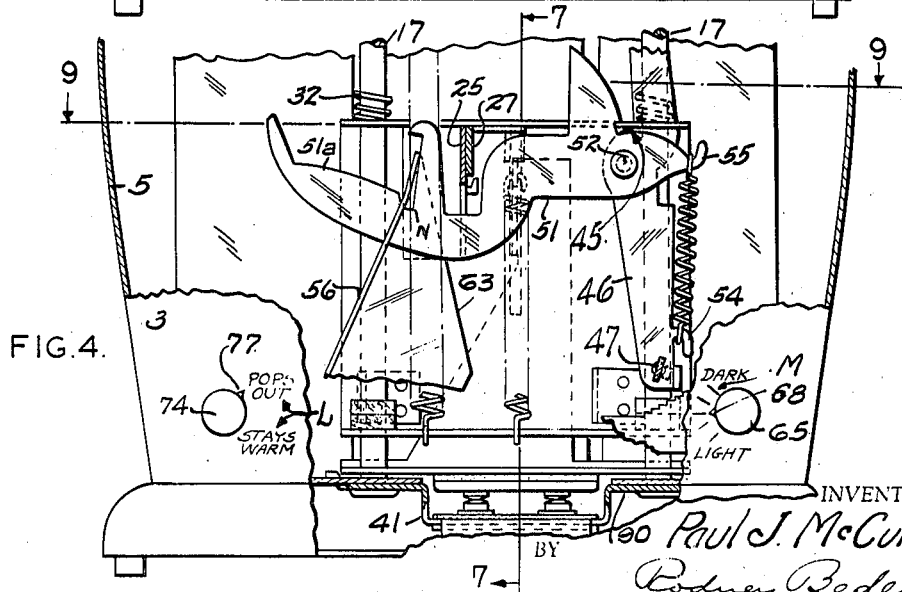
Figure 4 is a partial section corresponding to Figure 3 but showing the parts in a different position; namely, in that assumed at the beginning of a toasting operation.

The rocker includes a plate-like extension 63 which serves as a counterweight to move rocker arm 56 to the right to the position shown in Figures 3 and 4 except when held in a different position by thermostat 60. The action of thermostat 60 may be adjusted by a screw X which passes through both legs of the bimetal strip.

The manual variation of the toasting period is effected by a plate 64 (Figure 3) slidably mounted on clock frame plate 58 and movable transversely of the toaster by a crank shaft 65 (Figure 8) journalled at its outer end in end wall 3 and at its inner end in plate 14. The offset portion 65a passes through a slot 66 in plate 64, and manual rotation of the outer end of the crank shaft will move plate 64 to the right or left according to the direction of rotation. Portion 64a of the top edge of plate 64 is inclined to the horizontal and underlies a finger 67 on the lower end of bar 46 and limits the downward movement of the bar by directly engaging the same, thus preventing any additional winding of the mechanism by momentum of the bar after stoppage of the handle and carriage as could result in adjusting the movement of the latter. When plate 64 is moved to the right, the lowermost part of portion 64a will be beneath finger 67 and will permit the maximum downward movement of bar 46 and hence the maximum lapse of time before the upward movement of bar 46 will bring lever 51 into contact with the upper end of slot 59. Conversely, movement of plate 64 to the left will bring the highest point on portion 64a beneath finger 67 and will correspondingly shorten the length of time the clock mechanism may raise bar 46 before lever 51 engages the upper end of slot 59. A pointer 68 (Figure 4) on the outer end of crank shaft 65 is associated with marking M on wall 3 (Figure 4) to guide the user in shifting plate 64 to produce light, dark, or medium toast as indicated.

Figure 2:
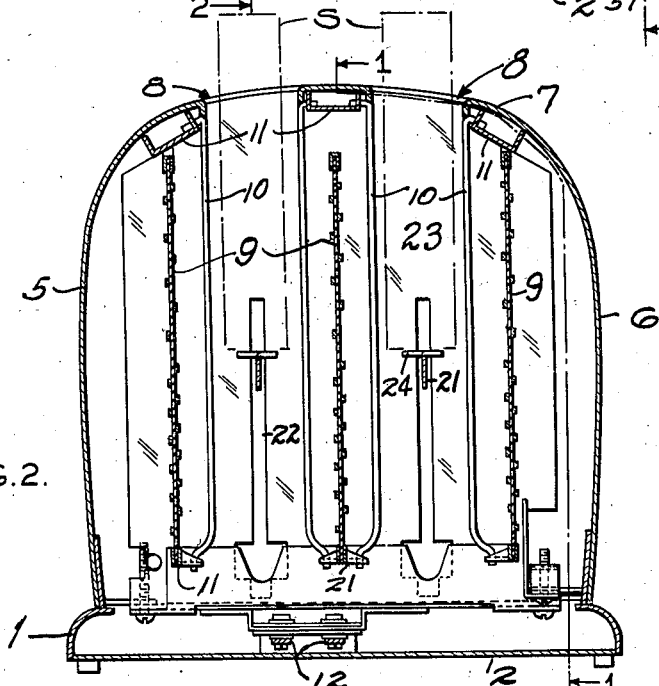
Figures 2 and 3 are vertical transverse sections taken substantially on the corresponding section lines of Figure 1.
Figure 7:
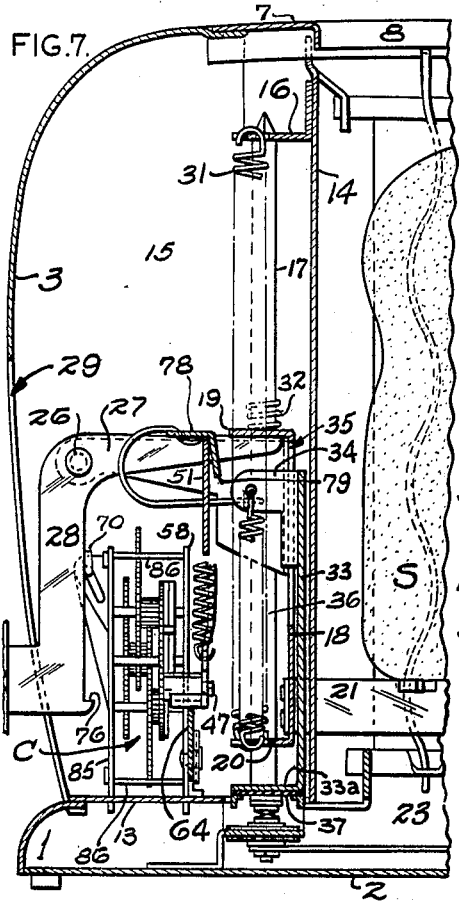
Figure 7 is a detail vertical longitudinal section taken on the line 7—7 of Figure 4.
Figure 8:
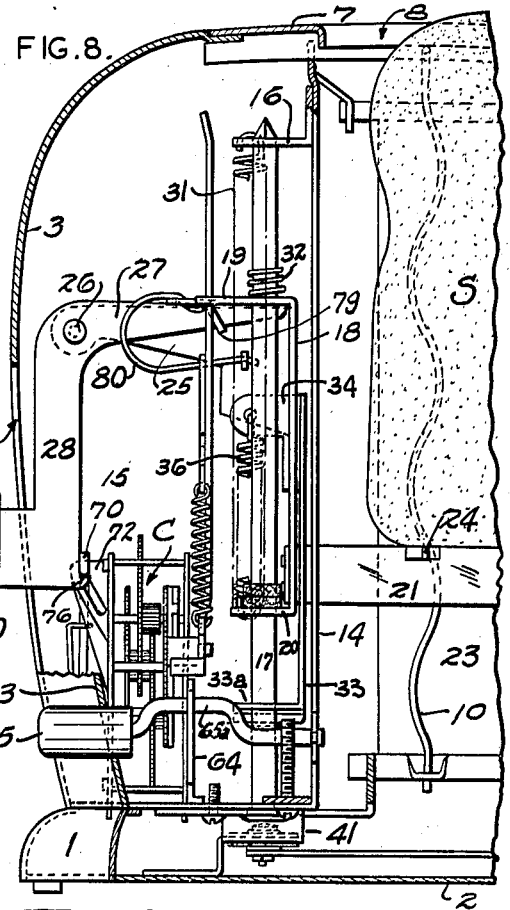
Figure 8 is a corresponding section showing the slice carrier and associated parts in elevated position as assumed following a toasting operation but with the slice mainly retained in the housing although projecting slightly therefrom to indicate that the toasting operation has been completed.

So far as the above described mechanism is involved, the release of the detent will result in raising the slice from the position shown in Figure 7, in which the slice is wholly within the housing, to the position indicated in Figure 2, in which the slice is projected above the housing so that it may be readily grasped by the user. It may be desired to substantially retain the slice within the housing, but at the same time to indicate visibly that the toasting operation is finished by bringing the upper portion of the slice to a level adjacent the housing top wall 7, as indicated in Figure 8, so that it may be readily seen by the user. For this purpose, there is provided a wire 70 (Figures 5 and 9) slidable through slots in flanges 71 and 72 on clock frame plate 58. The left hand end of wire 70 is bent to provide an upstanding leg 73. A spring 81 frictionally retains wire 70 in either position to which it is moved.

A pin 74 (Figures 1, 4 and 9) is journalled in end wall 3 and is provided with an upstanding arm 75 apertured to receive leg 73. Rotation of pin 74 through an arc of approximately ninety degrees shifts wire 70 from the full line position shown in Figure 5, in which the wire has no function, to the position indicated by broken lines, in which the right hand portion 70a of the wire forms a catch in the path of a shoulder 76 (Figures 7 and 8) on the lower end of bell crank leg 28. With catch 70a in this functioning position, the upward movement of the bell crank, following the release of the detent, will be limited by the engagement of elements 70a and 76 to hold the bell crank, carriage 18 and bars 21 in the position shown in Figure 8 so that the top of the slice of toast will barely emerge through openings 8 in housing top wall 7. The user is guided in adjusting the toaster to hold the toast in this position or to permit the toast to be projected as indicated in Figure 2 by a pointer 77 on pin 74 associated with the legend L on wall 3 (Figure 4).

To enable the user to inspect the toast, or, if desired, to terminate the toasting operation at any time, bell crank leg 27 is provided with a flange 78 (Figure 7) and upon tilting of handle 30 and the bell crank in a clockwise direction about pivot 26, the flange will depress the adjacent portion of detent lever 51 to release flange 16 from tooth 50 whereupon spring 31 will be free to raise carriage 18 and the toast to the position indicated in Figure 2.

If the toasting operation has been completed but the toast is being retained within the housing because of the engagement of hook 76 with catch 70a, then tilting of handle 30 and bell crank 27—28 as described above will release hook 30 from catch 70a and permit the carriage and the toast to be raised by spring 31 to the position indicated in Figure 2.

A downwardly inclined lip 79 on flange 78 is disposed to engage the inner face of lever 51 and thrust it away from the plate-like extension 63 on rocker 56 to avoid the frictional contact of these surfaces tending to retain the rocker in a time-shortening position, as indicated in Figure 5, after thermostat 60 has cooled sufficiently to release rocker arm 56a, at which time the rocker should rock back to the position shown in Figure 3.

While slice carrier bars 21 are shown mounted on carriage 18 and movable therewith, they could be mounted on and movable with plate 33 if desired, in which case the slice would be held stationary throughout the toasting operation. By mounting the bars on carriage 18, as shown, the slice is moved up gradually during the toasting operation from the position shown in Figure 7 to the position shown in Figure 8 and this movement, due to the wavy contour of slice retaining wires 10, avoids pronounced striping of the toast because of the interposition of bars 10 between the slice and the heating elements.

It is believed that the operation of the toaster will be clear from the above description and it will be obvious that the structure attains the operating objectives set forth in the introductory portion of this specification. It is pointed out that these objects are attained by a comparatively simple structure which is inexpensive to manufacture and which is not likely to get out of order or to deteriorate from wear at particular points. By arranging for the cooperation of springs 31 and 36 to energize the clock mechanism, by combining their tension to move bar 46 upwardly, it is possible to make each of these springs lighter than would be required otherwise and upon the release of tension of springs 36 (whether at the end of a timing period or by the manual disengagement of the detent), carriage 18 will be subjected to the upward thrust of spring 31 only and the tension of this spring will have decreased substantially from the maximum exerted when the toasting operation is begun by the downward movement of handle 30 to its lowermost position. This provides for the effective use of spring 31 to help actuate the clock mechanism when the spring is under maximum tension but without subjecting the slice carrier, when released from the detent, to the more sudden and forcible upward movement which would otherwise result if it were actuated by spring 31 when the latter was under maximum tension.

Irrespective of whether the slice is projected manually from the housing in the middle of the toasting operation, or automatically promptly at the end of the toasting operation, or manually subsequently because of the use of holding wire 70, the upward movement of the toast to projected position will always result from the action of spring 31.

The clock frame plates 58 and 85 are held in assembled relation with each other and with plate 13 on which they are mounted by a simple interlocking structure best shown in Figures 3, 6, 7 and 9. Posts 86 have shouldered ends extending through and riveted to plate 58, their opposite ends extending through plate 85 and being slotted transversely to receive the plate 85 when the latter is shifted in a direction parallel to plate 58. Tabs 87 extend downwardly from the lower edges of plates 58 and 85 and may be inserted through slots 88 in partition plate 13. These tabs are slotted horizontally to receive plate 13 when plates 58 and 85 are shifted to the left to the position indicated in Figures 5 and 6. Switch yoke 41 has an offset tongue portion 89 which may be inserted through a slot 90 in plate 13 to support one end of the yoke. The other end of the yoke terminates in a horizontal flange 91 which lies against the bottom of plate 13 and is secured thereto by a single screw 92. The left hand edge of flange 91 bears against the right hand edge of one of the tabs 87 holding all of the latter in the position indicated in which they are interlocked with plate 13.

Hence the entire assembly of the clock plates, partition plate 13 and switch yoke 41 are maintained in rigid assembly with each other by the single screw 92.

Numerous features of the structure may be used without necessarily using all of the features described and all of the details of the construction may be varied substantially without departing from the spirit of the invention, and the exclusive use of such modifications of the structure as come within the scope of the claims is contemplated.

What is claimed is:

1. In a toaster, a housing, a slice carrier movable from a retracted toasting position, in which a slice on the carrier is enclosed in said housing, to a projected position, in which a substantial portion of the slice protrudes from said housing, means for moving said carrier slowly from its retracted position towards its projected position during the toasting operation, means automatically moving said carrier rapidly towards the projected position immediately upon completion of the toasting operation, and a selective device for holding said carrier against movement to the projected position upon completion of the toasting operation, a manually operable member associated with said carrier and means to move the former to toasting position and to energize the latter, and a connection between said member and device for releasing the latter by manual movement of said member when desired.

2. In a toaster of the class described, a heating circuit, a clockwork escapement mechanism including a main gear, a crank-like bar extending from said gear and adjustably connected thereto, a slice carriage member slidable longitudinally of said bar to a slice toasting position, and carrying a switch element for closing said circuit, a lever pivoted on said bar and having a detent tooth for engaging said member when it is moved in one direction from an original position to a given position relative to said bar, said element closing said circuit during such movement, a spring tensioned by said movement and tending to return said member to its original position and thereby energizing said escapement mechanism through said lever, bar and gear, and an adjustable device for tripping said detent lever following movement of said member along said bar in the direction opposite to that mentioned above.

3. In a toaster of the class described, a housing, a carriage structure movable downwardly in said housing from an elevated position in which a slice on said structure is projected in part from the housing to a lowered position in which the slice will be enclosed in said housing, a lever pivoted on said structure, there being opposing elements on said structure and one end of said lever limiting the pivotal movement of the lever in one direction, a handle on the other end of said lever, whereby the structure may be lowered by downward pressure on said handle, a spring for raising said structure, a clockwork mechanism, a latch connection between said structure and said mechanism and engaged by the downward movement of said structure for energizing said mechanism by said spring, means for disengaging said connection automatically after a lapse of time determined by said mechanism, said lever having a part for disengaging said connection at will by lifting said handle and thereby tilting said lever on said structure.

4. A toaster as described in claim 3 which also includes a catch on said handle and a cooperating stop on said housing movable selectively to restrain the carriage structure from upward movement by said spring when the connection to the clock mechanism is disengaged automatically, said catch being movable out of engagement with said stop when said handle is lifted to tilt said lever.

5. A toaster comprising a toasting chamber, heating means in said chamber for performing a toasting function, a slice-holder in said chamber, a vertically movable carriage attached to said holder for moving said holder between a toasting and non-toasting position, means biasing said holder and said carriage to their non-toasting position, a catch member, structure secured to said carriage and movable therewith and adapted to engage said catch member so as to latch said holder and carriage in their toasting position, switch means for controlling said heating means, means for actuating said switch means to the circuit closing position when said carriage is moved to its toasting position, timing means for measuring the toasting interval, means actuated by said timing means for moving said catch member so that said holder and carriage are moved by said biasing means to the non-toasting position at the end of the toasting interval, a secondary catch member adapted to be engaged by said structure to limit the upward movement of said carriage after the operation of said first-mentioned catch member, said secondary catch member being movable manually at will into or out of structure-engaging position, and manually operable means for moving said structure to release it from said secondary catch member to permit said slice-holder and carriage to move to their non-toasting position.

6. In a toaster of the class described, a housing, an operating lever including a handle, a slice carrier movable by said lever at the will of the operator into a position in which a slice thereon is enclosed within said housing, yielding means biasing the slice carrier, into a position in which a substantial portion of a slice therein is projected beyond said housing, an electrical heating circuit, means for closing said circuit by the movement of said handle to move the slice carrier into slice enclosing position, a timing mechanism, energized by the latter-mentioned movement of said lever, for opening said circuit at the end of a predetermined period, and means operable by said handle for opening said circuit and terminating the heating operation at any time before said timing mechanism has functioned to terminate the operation, there being means holding the carrier in the slice enclosing position against said yielding means during the toasting operation and normally releasing the carrier at the end of the toasting operation, said means being releasable at will by manual manipulation of said handle.

7. In a toaster, a housing, a slice carrier movable from a toasting position in which a slice thereon is continued within said housing and to a position in which a substantial portion of the slice thereon is projected from said housing, a member projecting from said housing for manually moving the carrier to toasting position, a spring biasing the carrier from toasting position to slice projecting position, a clock escapement, a device for connecting the escapement to the carrier when the latter is moved to toasting position and thereby energizing the escapement, means automatically terminating said connection at the end of a toasting period to permit the carrier to be moved by said spring to non-toasting position, and a member for holding the carrier against movement to slice projecting position when said connection is terminated, and means for releasing the carrier from said device by manipulation of said member.

8. In a toaster of the class described, a housing, a slice carrier therein movable from a non-toasting position in which a substantial portion of a slice thereon is projected beyond the housing to a toasting position in which the slice is enclosed within the housing, means thrusting the carrier towards the non-toasting position, a latch for retaining said carrier in said toasting position against the thrust of said means, an operating member associated with the carrier and projecting from the housing and having a handle on its projecting portion whereby manual movement of the handle in one direction will move the carrier from non-toasting to toasting position, a timing mechanism energized by said handle movement and operating automatically at the end of a toasting period to release said latch, an element engaging said member to prevent the automatic return of the same and the carrier to their initial non-toasting position, said element being disengageable by manual movement of said handle.

9. In a toaster of the class described, a housing, a slice carrier therein shiftable from a non-toasting position in which a substantial portion of a slice thereon is projected beyond the housing to a toasting position in which the slice is enclosed within the housing, means thrusting the carrier towards the non-toasting position, a latch for retaining said carrier in said toasting position against the thrust of said means, an operating lever pivoted on the carrier and projecting from the housing and having a handle on its projecting portion, there being a stop on the carrier limiting pivotal movement of the lever in one direction whereby the carrier may be shifted from non-toasting to toasting position by manual movement of the handle in one direction, a timing mechanism, energized by said handle movement and operating automatically at the end of a toasting period to release said latch, and means operable by manually tilting the lever on its pivot away from said stop for releasing said latch and thereby terminating the toasting operation at any time before the timing mechanism has functioned to terminate the operation.

10. A toaster as described in claim 9 which includes an element for engaging said lever to prevent the automatic return of the carrier to its initial non-toasting position, said element being disengageable by manual pivotal movement of the lever by said handle.

11. A toaster as described in claim 9 which includes an electric heater, a switch therefor, means for closing the switch by movement of the carrier to toasting position, and means for opening the switch when the lever is tilted manually to terminate the toasting operation.

12. In a toaster of the class described, a slice carrier structure movable manually from a non-toasting to a toasting position, a spring biasing said carrier structure to non-toasting position, a timing mechanism controlling the action of said spring and energized thereby and including a gear, a clutch disc associated therewith and a winding bar on said disc and actuated by said structure movement, and an adjustable stop in the path of movement of said winding bar to limit the energizing movement of the same by said structure and thereby varying the toasting period.

13. In a toaster of the class described, a slice carrier structure movable from a non-toasting position to a toasting position, a clockwork timing mechanism, a detent lever operatively connecting said timing mechanism and said carrier structure and being movable bodily with said carrier structure during the toasting operation, a spring for biasing the carrier structure towards the non-toasting position and thereby energizing the timing mechanism, a tripping device for engaging said detent lever as the carrier structure moves towards non-toasting position, said device comprising an elongated arm having a substantially fixed pivot at one end and a detent engaging part spaced from said end and movable lengthwise of the detent lever but in a path inclined thereto, the device also including a thermostat for moving said member to vary the position of said part along said arm, said thermostat member being free of engagement with the detent lever.

PAUL J. McCULLOUGH.